(12) United States Patent
Ravine

(10) Patent No.: US 9,565,226 B2
(45) Date of Patent: Feb. 7, 2017

(54) MESSAGE CAPTURING AND SEAMLESS MESSAGE SHARING AND NAVIGATION

(71) Applicant: Guy Ravine, San Francisco, CA (US)

(72) Inventor: Guy Ravine, San Francisco, CA (US)

(*) Notice: Subject to any disclaimer, the term of this patent is extended or adjusted under 35 U.S.C. 154(b) by 0 days.

(21) Appl. No.: 14/180,169

(22) Filed: Feb. 13, 2014

(65) Prior Publication Data

US 2014/0229835 A1 Aug. 14, 2014

Related U.S. Application Data

(60) Provisional application No. 61/764,517, filed on Feb. 13, 2013.

(51) Int. Cl.

| | | |
|---|---|---|
| *G06F 3/0488* | (2013.01) | |
| *H04L 29/06* | (2006.01) | |
| *H04L 12/58* | (2006.01) | |
| *H04L 12/18* | (2006.01) | |

(52) U.S. Cl.
CPC .......... *H04L 65/60* (2013.01); *G06F 3/04883* (2013.01); *H04L 12/1822* (2013.01); *H04L 51/10* (2013.01); *H04L 65/4069* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,809,724 B1* | 10/2004 | Shiraishi | ................. | G06F 1/163 345/157 |
| 7,117,453 B2* | 10/2006 | Drucker | ............ | G06F 17/30011 707/E17.008 |
| 7,624,416 B1* | 11/2009 | Vandermolen | ......... | H04H 60/33 709/203 |
| 7,688,229 B2* | 3/2010 | Sula et al. | ............... | 340/995.17 |
| 7,730,405 B2* | 6/2010 | Gulli et al. | .................. | 715/719 |
| 7,849,116 B2* | 12/2010 | Jacobs | .................... | H04L 67/22 707/723 |
| 8,347,213 B2* | 1/2013 | Clifton et al. | ................ | 715/730 |
| 8,767,081 B2* | 7/2014 | Kaheel | ................... | H04N 5/272 348/207.1 |
| 2001/0043233 A1* | 11/2001 | Sato et al. | ..................... | 345/706 |
| 2002/0049852 A1* | 4/2002 | Lee | ......................... | H04L 12/58 709/231 |
| 2006/0206581 A1* | 9/2006 | Howarth et al. | ............. | 709/217 |
| 2006/0271381 A1* | 11/2006 | Pui | .................. | G06Q 10/06311 705/7.13 |
| 2008/0066136 A1* | 3/2008 | Dorai et al. | .................. | 725/135 |

(Continued)

Primary Examiner — Phenuel Salomon
(74) Attorney, Agent, or Firm — John W. Crosby

(57) ABSTRACT

A system, computer-readable storage medium storing at least one program, and a computer-implemented method for creating video streams is provided. An indication is received that is related to a first video being received or requested. The first video includes attributes characterizing content of the first video. A second video stored in a database is selected in response to receiving the indication. The selection is based on at least one attribute of the first video. An order of the first video and the second video is determined by one or more processors. The order is based on the at least one attribute characterizing the content of the first video. A video stream is generated on a user display by providing the first video and the second video in the determined order and in a substantially seamless manner.

23 Claims, 12 Drawing Sheets

(56) References Cited

U.S. PATENT DOCUMENTS

| | | | |
|---|---|---|---|
| 2008/0090553 A1* | 4/2008 | Wan | H04L 12/5835 455/413 |
| 2008/0288870 A1* | 11/2008 | Zheng | H04N 7/14 715/719 |
| 2009/0005011 A1* | 1/2009 | Christie | G06Q 10/107 455/412.2 |
| 2009/0089188 A1* | 4/2009 | Ku et al. | 705/30 |
| 2009/0133051 A1* | 5/2009 | Hildreth | 725/28 |
| 2009/0158203 A1* | 6/2009 | Kerr et al. | 715/784 |
| 2010/0332518 A1* | 12/2010 | Song | G06F 3/0483 707/769 |
| 2011/0099195 A1* | 4/2011 | Patwardhan et al. | 707/769 |
| 2011/0191693 A1* | 8/2011 | Baggett | G06Q 10/107 715/752 |
| 2012/0198353 A1* | 8/2012 | Lee et al. | 715/748 |
| 2013/0083906 A1* | 4/2013 | Roberts et al. | 379/88.13 |
| 2014/0101551 A1* | 4/2014 | Sherrets et al. | 715/723 |

* cited by examiner

MESSAGE CAPTURING AND SEAMLESS MESSAGE SHARING AND NAVIGATION

RELATED APPLICATION

This application claims the priority benefit of 35 U.S.C. 119(e) to U.S. Provisional Application Ser. No. 61/764,517, entitled "SEAMLESS VIDEO SHARING AND NAVIGATION TECHNIQUE," filed Feb. 13, 2013, which application is incorporated by reference herein in its entirety.

TECHNICAL FIELD

The present disclosure relates to communication applications in general and, in particular, to capturing, sharing, and navigating electronically captured messages.

BACKGROUND

Communications devices may include video capturing capabilities. Captured videos may be shared with friends and family by sending video files between users or by posting videos on the Internet. These videos may be organized individually based on information such as titles and/or require a specific hyperlink to view the video. A user may be notified that a video has been posted or received. The video may be accessed and rendered on a device, such as a mobile phone.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

DESCRIPTION OF EXAMPLE EMBODIMENTS

Overview

Embodiments relate to systems and methods providing engaging, immersive, and organized communications for one or more users. In one embodiment, messages, such as video messages and the like, may be shared among a single user, multiple friends, families, or groups in an efficient manner. Videos may be captured using a camera or a device coupled to a camera, such as, but not limited to, mobile phones, tablet computing devices, laptop or desktop computers, optical head-mounted devices, watches, and the like wearable computing devices, as well as any other device suitable for capturing images. For example, the user may use a mobile device, executing a software application, to record a video of a message or a scene using a camera on the mobile device. The recorded video message may be transmitted and directed to one or more users as part of a video message "conversation."

Users accessing shared video messages may receive a video stream of multiple video messages. The video messages may be presented in an organized manner and played back in a substantially seamless manner. As used herein, seamless can mean continuous and/or uninterrupted. In one example, multiple videos from multiple users may be stitched together in a chronological order to create the seamless video stream. In one aspect, the video stream, when played back, can appear to be similar to a conversation, a television broadcast, or a video channel, thereby presenting the video messages in a way that the discussions and messages can be understood and followed easily. Accordingly, generating and providing video streams by stitching multiple video messages from multiple users can provide users an engaging experience.

The video communication system and methods can also include efficient techniques for capturing, sharing, and distributing videos. In particular, some example embodiments provide automatic systems and methods for capturing video messages, sending video messages, and/or playing video messages. For example, in one particular example, a first device may detect that a first user intends to create a video message and, in response, captures the video message automatically. Furthermore, the first device can process the video message and determine recipients ("targets") of the video message and automatically send the video message to the detect targets. Further yet, a second user using a second device may receive that the video message from the first user. The second user device may monitor sensor inputs to detect whether the second user is ready to watch the video message. Based on the sensor inputs, the second device can automatically playback the video stream of the video message when it detects that the second user is ready to receive the video message. As a result, various embodiments may reduce the amount additional inputs that users provide in order to share and view video messages.

Example Systems

Figure 1:
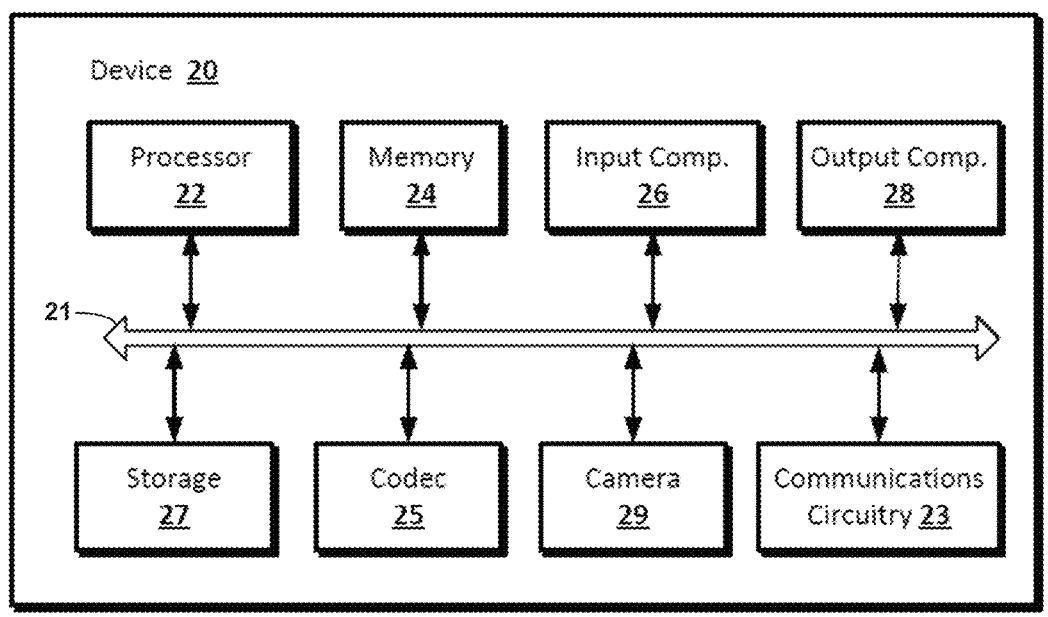
FIG. 1 shows an example block diagram of a device, according to an embodiment.

FIG. 1 shows an example block diagram of a device 20, according to an embodiment. The device 20 may include a bus 21, processor 22, communications circuitry 23, memory 24, coder/decoder (CODEC) 25, input components 26, storage 27, output components 28, and a camera 29.

The device 20 may include or be part of a variety of types of devices, such as a mobile phone (including a "smartphone"), tablet computer, netbook, laptop, desktop, personal digital assistant ("PDA"), set-top box, television, and/or wearable computing devices (e.g., an optical head-mounted display, a watch, etc.), among others. The processor 22 may be any suitable programmable control device and may control the operation of one or more processes, such as video control and display as discussed herein, as well as other processes performed by the device 20.

The memory 24 may include one or more different types of memory which may be used for performing device functions. For example, the memory 24 may include cache, ROM, and/or RAM. The bus 21 may provide a data transfer path for transferring between components of the device 20. The CODEC 25 may be included to process digital and analog audio and/or video signals to produce sound, voice, and multimedia. The output components 28 may include components and/or interfaces for providing output such as a display for visual output and one or more speakers for providing audio output. The output components 28 may also include interfaces for providing output to a secondary device. For example, the device 20, which may include a handheld device, may include an interface for displaying videos on a Television or another device.

The storage 27 may store multimedia (e.g., video, audio, and photos, etc.), software (e.g., for implementing various functions on device 20), and any other suitable data. The storage 27 may include a storage medium, such as a harddrive, solid state drive, flash drive, and the like. The storage 27 may be integral with the device 20 or may be separate and accessed through an interface to receive a memory card, USB drive, optical disk, and the like.

The input components 26 may include components and/or interfaces for allowing a user to interact with the device 20. For example, the input components 26 may include touch inputs such as buttons, a keypad, a touch screen, and the like, as well as other forms of user input such as positional and proximity information, as well as audio input through one or more microphones. Furthermore, the input components 26 may include components supporting visual user input. For example, the camera 2009 may capture images for processing as inputs. One embodiment, image processing can be used to identify gestures, such as hand movements and/or eye movements, as user inputs to control the operation of the device 20.

The communications circuitry 23 may provide the device 20 the ability to communicate with other devices via one or more local, wide-area, or other networks using wired or wireless techniques. For example, the communications circuitry 23 may provide connectivity using wireless techniques such as Wi-Fi, Bluetooth™, digital cellular telephone connection, Cellular Digital Packet Data (CDPD) connection, digital satellite data connection or the like.

The camera 29 may enable the device 20 to capture video, still images, and/or both. The camera 29 may capture an image or series of images continuously, periodically, at select times, and/or under select conditions. The camera 29 may be part of one or both a front-facing camera or rear-facing camera of the device 20.

The device 20 may be battery-operated and portable so as to allow a user to conveniently communicate with others via video or audio communication, listen to music, play games, or control other devices. The device 20 may be relatively compact which enables a user to easily manipulate the device's position, orientation, and movement. Accordingly, the device 20 may provide techniques of sensing such changes in position, orientation, and movement to enable a user to interface with or control the device 20 by affecting such changes. For example, the device 20 may include one or more gyroscopes, proximity detectors, accelerometers, and the like. Further, the device 20 may include a vibration source, under the control of processor 22, for example, to facilitate sending motion, vibration, and/or movement information to a user related to an operation of the device 20. It should be noted that other components may be part of or operatively coupled to the device 20, and conversely, all of the components shown in FIG. 1 need not be present to practice the present disclosure.

Figure 2:
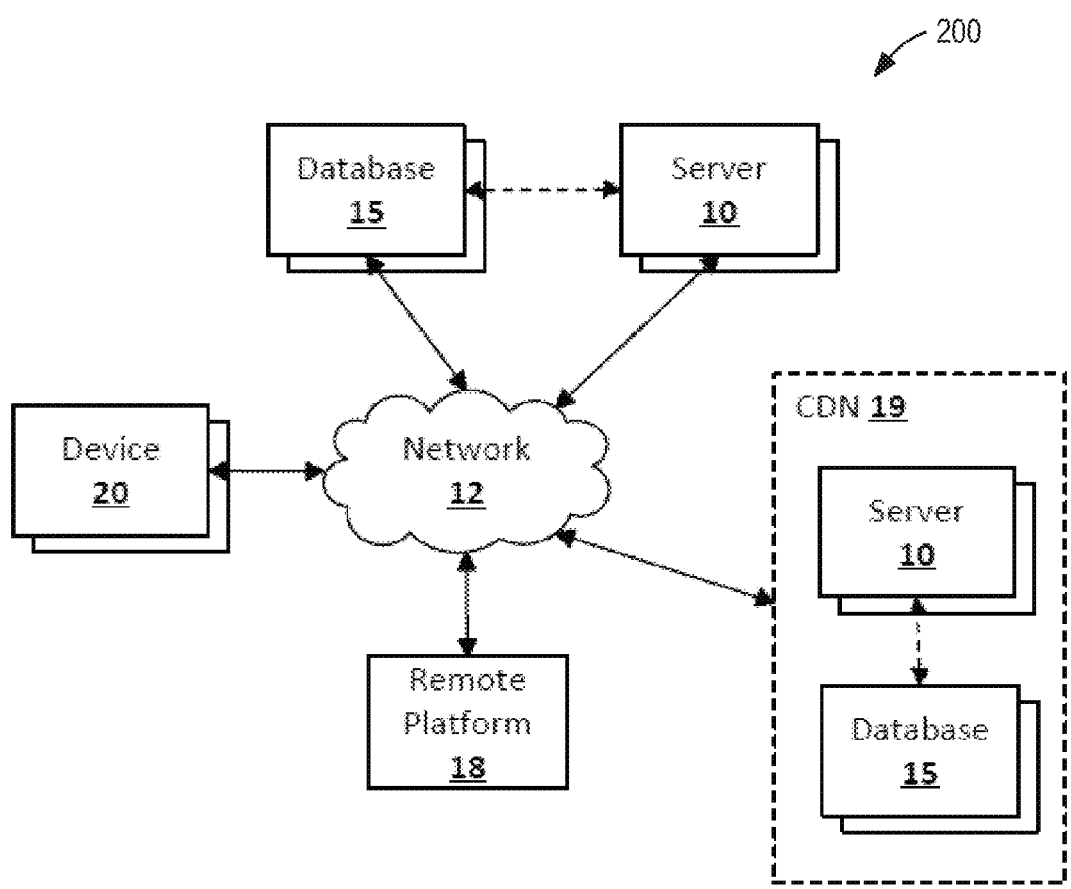
FIG. 2 shows an example network arrangement, according to an embodiment.

FIG. 2 shows an example network arrangement 200, according to an embodiment. The illustrated network arrangement 200 includes one or more devices 20, as described above in connection with FIG. 1. The network 12 may include a local network, wide-area network (including the Internet), or any other suitable communication network or networks, and may be implemented on any suitable platform including wired and/or wireless networks.

The servers 10 may be directly accessible by the devices 20, or one or more other devices 20 may provide intermediary access to a server 10. The devices 20 and/or servers 10 may access remote platforms 18 or services provided by remote platforms 18, such as cloud computing arrangements and services. The remote platform 18 may include one or more servers 10 and/or databases 15. The term server may be used herein and may include a single server or one or more servers. For example, a server 10 may include one or more servers responsible for authentication, licensing, and delivering and/or storing content (which may be part of a Content Delivery Network (CDN) 19), or any combination thereof including additional or fewer types of servers.

The devices 20 may communicate with other devices 20 and one or more servers 10 and/or databases 15 using any suitable communication platform implementing one or more user-device, client-device, and server-device communication applications, including social-networking/messaging applications, websites, and the like, in which users can send and receive video messages to and from particular individuals (e.g., contacts) and/or user groups, as will be described in greater detail below.

Figure 3:
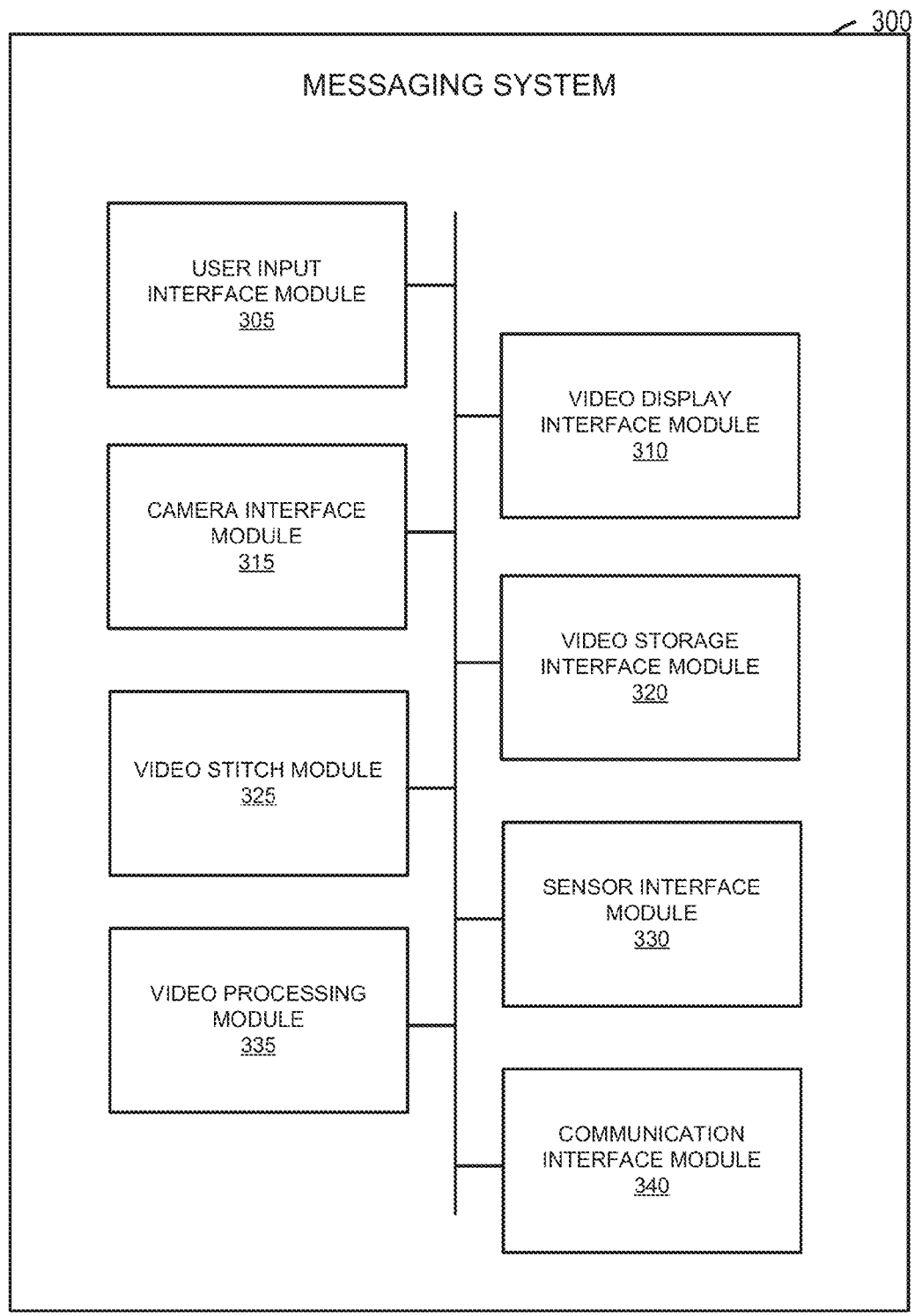
FIG. 3 is a block diagram showing example components of a video message capturing, sharing, and navigation system, according to some embodiments.

FIG. 3 is a block diagram showing example components of a video message system 300, according to some embodiments, for capturing, sharing, and navigating video messages. The video message system 300 can include a user input interface module 305, a video display interface module 310, a camera interface module 315, a video storage interface module 320, a video stitch module 325, a sensor interface module 330, a video processing module 335, and a communication module 340. In some embodiments, the components of the video message system 300 can be included by the device 20 of FIG. 1. However, it will be appreciated that in alternative embodiments, one or more components of the video message system 300 described below can be included, additionally or alternatively, by other devices, such as one or more of the servers 10, the network 12, the remote platform 18, the client devices 20 of FIG. 2.

The user input interface module 305 may be a hardware-implemented module which may receive user inputs for processing and control. For example, the user input interface module 305 may receive user inputs via a graphical user interface and various input devices. The user inputs can be indicative of various commands related to capturing video, sharing a video message, displaying a video message, navigating within a video stream, and the like operations.

The video display interface module 310 may be a hardware-implemented module which may control information or data that is provided to a client device (e.g., the device 20 of FIG. 1) for display on the client device. For example, the video display interface module 310 may be configured to provide display data associated with capturing, sharing, and/or displaying a video message, displaying user interfaces associated with capturing, sharing, and/or displaying one or more video messages, and the like.

The camera interface module 315 may be a hardware-implemented module which may control an imaging device, such as a camera, and may receive images from the imaging device. The camera interface module 315 may control the imaging device based on internal controls generated by the video message system 300, as well as based on user inputs received by the user input interface module 305. For example, the user may activate the imaging device to capture a video message. The camera interface module 315 may also be configured to store the captured video message using the video storage interface module 320. In some embodiments the camera interface module 315 receives a video message provides the video message to the video processing module 335 for further processing, as will be described below in greater detail.

The video storage interface module 320 may be a hardware-implemented module which may store, manage, and retrieve information associated with video messages received from a client device. For example, the video storage interface module 320 may store, manage, and retrieve video messages, and the like, received from camera interface module 315 and/or the communication module 340, and maybe configured to provide display data for the video display interface module 310. The video storage interface module 320 may store data on one or more storage devices, including storage 27 of FIG. 1 and/or database 15 of FIG. 2.

The video stitch module 325 may be a hardware-implemented module which may generate a video stream from a plurality of video messages provided by one or more users. The video stitch module 324 can be configured to generate a video stream based on a number of triggering events. For example, the video stitch module 325 may be triggered to generate a video stream in response to the video message system 300 receiving a video message. As such, the video stitch module 325 may be configured to generate the video stream prior to a request for playback of the video stream. Pre-generating the video stream in this manner can reduce the delay between providing the video stream and receiving a request for playback, since the video stream has already been generated.

Additionally or alternatively, the video stitch module 325 may be triggered to generate a video stream in response to the video message system 300 receiving a request to play a video message. As such, the video stitch module 325 may be configured to generate the video stream dynamically just before, or even during, playback of the video stream. For example, the video stitch module 325 may provide a sequence of separate video messages, playing the video messages one after another, to generate the video stream rather than generate a separate video stream file. Dynamically generating the video stream in accordance with the techniques described above can reduce the amount of storage required to store the video messages and can provide flexible, on-demand generation of video streams.

It will be appreciated that other triggering events are contemplated, and the above-described examples of triggering events were presented for illustration purposes only and are not limiting. For example, a person of ordinary skill will appreciate that a triggering event can be related to searches for video messages satisfying a search criterion. For example, a user may perform a search for video messages that were shared by particular users that may also satisfy one or more additional search parameters. The video stitch module 325, in response to receiving the search indication, may dynamically generate a video stream of video messages satisfying the search parameters.

Accordingly, the video stitch module 325 may be configured to generate the video stream by determining one or more video messages with which to form the video message. The video stitch module 325 can determine the one or more of video messages based on attributes characterizing the content of the one or more video messages. Examples of attributes include attributes that characterize the source users (e.g., the users who generated and/or shared the video message), user groups (e.g., the users who may view the video message), time stamps, subject matter of the video, relevancy of the video to the viewing user, relevancy of the video to a subject matter (e.g., to a conversation or search inquiry), and/or popularity. For example, in response to the video stitch module 325 being triggered to generate a new video stream, the video stitch module 325 can access a data store or database (e.g., databases 15 and/or storage 27) storing video messages. The video stitch module 325 can select one or more video messages substantially matching an attribute, such as video messages shared to a particular user group.

Once a plurality of video messages has been selected, the video stitch module 325 can be configured to determine an order of the selected video messages to be presented within a video stream. The order can be determined based on one or more attributes of the video messages. In one embodiment, the video stitch module 325 can order the video messages chronologically, by relevance, by popularity, or the like characteristics suitable for creating an order or ranking. For example, popularity can be determined based on the number of times that the video message has been forwarded, shared, re-posted, received positive feedback ("liked"), and the like considerations.

Once an order has been determined, the video stitch module 325 can be configured to generating a video stream on a user display by providing the first video message and the second video messages in the determined order and in a substantially seamless manner. It will be appreciated that generating a video stream can refer to providing display data to a device for display (e.g., a server providing display data to a client device), as well referring to rendering the video of the video stream on a display of a device (e.g., a client device displaying the video on a display of the client device). For example, the video stitch module 325 can provide display data to the video display interface module 310 for display.

The sensor interface module 330 may be a hardware-implemented module which may provide sensor information (e.g., measurements) related to a user device and/or its environment. For example, the sensor interface module 330 may be coupled to one or more sensors—such as, but is not limited to, accelerometers, gyroscopes, positional sensors (e.g., GPS receivers), proximity sensors, pressure sensors, temperature sensors, and the like measuring devices and/or instruments. The sensor information provided by the sensor interface module 330 may be included with and/or stored within a video message as metadata. Additionally or alternatively, the information provided by the sensor interface module 330 may be used by a first user device to detect nearby or proximal second devices that may be used to display a received video stream or to capture a video message. For example, a video stream can be relayed from the user device 20 to another device, such as a high-definition television, for display. In another example, the device can wirelessly couple to a nearby video camera to record a video message. Additionally or alternatively, the information provided by the sensor interface module 330 may be used to determine a position, orientation, and/or attitude of the user device 20. In an embodiment, the orientation of the device respect to the user can be indicative that the user intends to capture or playback video, as will be described in greater detail below.

The video processing module 335 may be a hardware-implemented module which may process video messages. For example, the video processing module 335 may receive video messages from the camera interface module 315, from the video storage interface module 320, and/or from the communication module 340. In one embodiment, the video processing module 335 generates a transcript of a video message by performing a speech-to-text algorithm to the audio of the video message. Furthermore, the video processing module 335 can identify user names mentioned within the transcript to determine automatically one or more target users of the video message (e.g., a contact to whom the video message is to be sent), or to determine keywords automatically to be included in the metadata associated with the processed video message. The keywords can be used for searching purposes or to notify the mentioned users that a video message makes reference to the mentioned users. Additionally or alternatively, the video processing module 335 can be configured to cause the device 20 to automatically perform a task (e.g., such as calendar an event, add items to a wish list, etc.) based on keywords mentioned in an audio or video message or a conversation and based on sensor and contextual information.

In other embodiments, as will be described in greater detail below, the video processing module 335 can monitor substantially real-time video provided by the camera interface module 315 to automatically capture, share, and/or display video messages. For example, the video processing module 335 may monitor video of the user by using a front-facing (e.g., user-facing) camera of the device. Based on the images and/or audio of the video, the video processing module 335 may record a video message, display a received video message, and/or the like.

The communication module 340 may be a hardware-implemented module which may transmit and/or receive data related to video messages. For example, the communication module 340 may receive a video message, captured by the device 20 of a user, from the camera interface module 315, and may transmit the video message over the network 12 to the server 10. Furthermore, the communication module 315 may receive a video message from the network 12 and store the received video message using the video storage interface module 320.

Example User Interfaces

Figure 4:
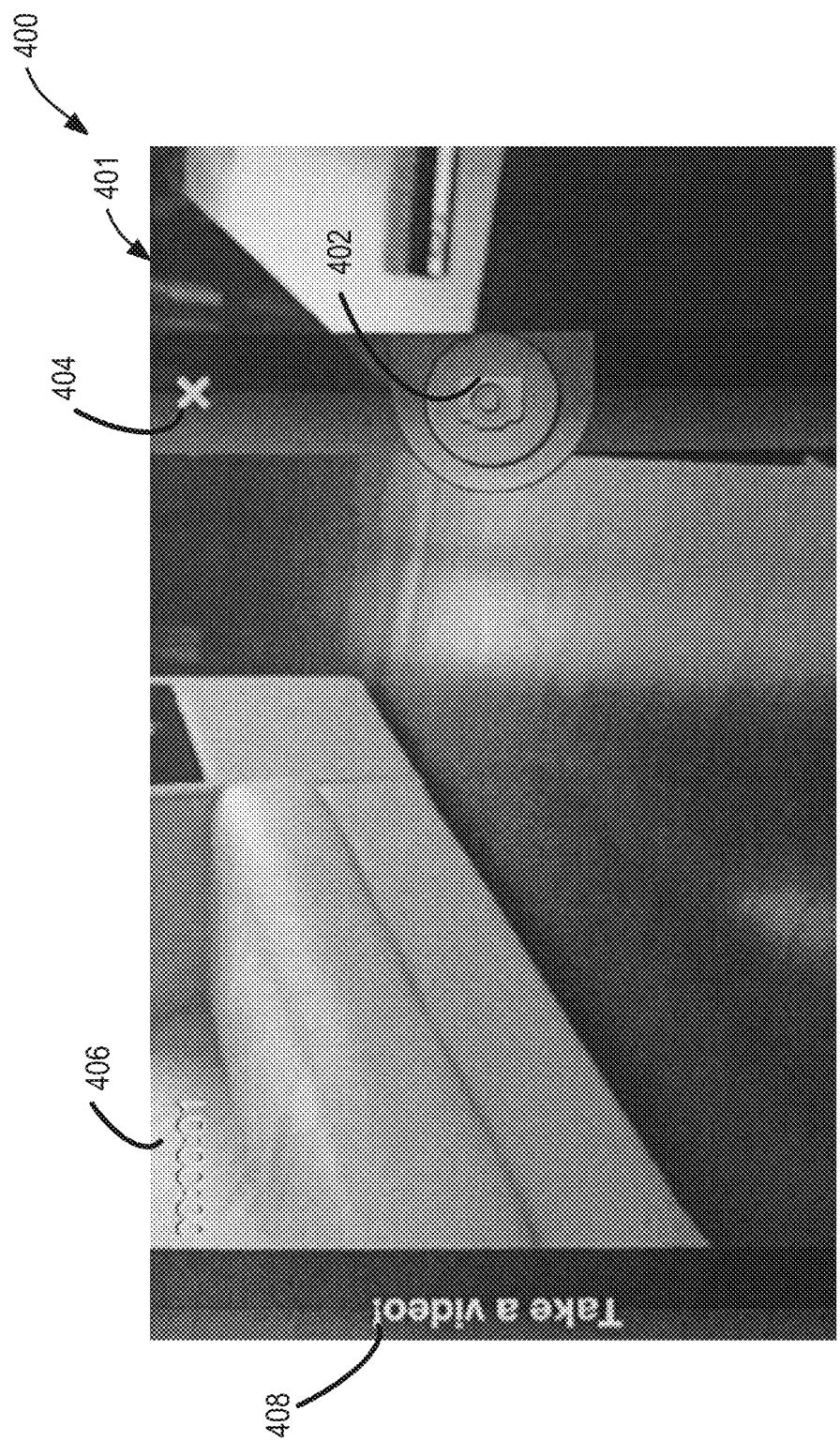
FIG. 4 is an interface diagram illustrating an example user interface of a device operating in a video message capture mode, according to some embodiments.

FIG. 4 is an interface diagram illustrating an example user interface 400 of a device operating in a video message capture mode, according to some embodiments. For example, the user interface 400 can be provided by the video display interface module 310 of FIG. 3 for display on the device 20 of FIG. 1. The illustrated user interface 400 includes a video display element 401, a capture control element 402, a close control element 404, a time display element 406, and a text display element 408. As shown, video capture may be activated by a touch input, such as a touch-sensitive display.

The video capture mode corresponds to a mode in which the user can use the device to record or capture a video message for sharing. In operation, the video display element 401 can display substantially real-time images captured by a camera of the device. The display provides the user visual feedback of what the device may be recording. The capture control element 402 can provide a control for the user to start or stop recording of a video message. One embodiment, activating the capture control element 402 can change a display of the user interface 400. For example, the capture control element 402 may change from green to red as the state of the device changes from an idle state to a recording state. The close control element 404 can provide the user to control for exiting out of the video message capture mode. For example, if the user touches the touchscreen display of the device edit location about the close control element 404, the device may exit out of the video capture mode. The time display element 406 can be configured to display the elapsed time of recording while the device is the recording state. In some embodiments, the display time may correspond to an aggregate time of videos to be stitched together to form one video message. For example, the user may start and stop recording to generate a video message formed from a series of recordings. The text display element 408 can be configured to provide text for the user. For example, in the illustrated embodiment, the text "Take a video!" is provided to give the user an indication that the device is in the video capture mode.

Figure 5:
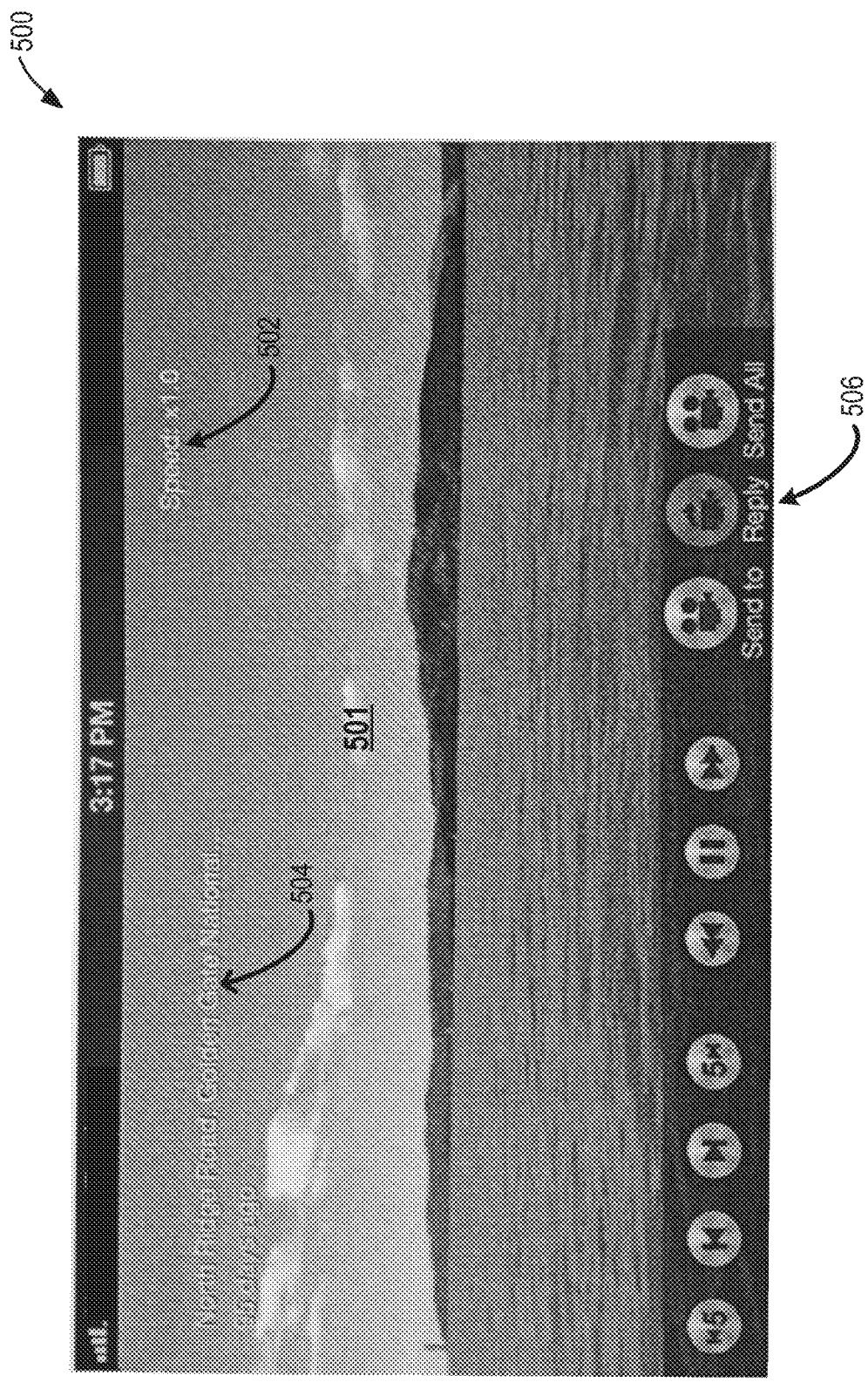
FIG. 5 is an interface diagram illustrating an example user interface of a device operating in a video stream playback mode, according to some embodiments.

FIG. 5 is an interface diagram illustrating an example user interface 500 of a device operating in a video stream playback mode, according to some embodiments. For example, the user interface 500 can be provided by the video display interface module 310 of FIG. 3 for display on the device 20 of FIG. 1. The illustrated user interface 500 includes a video display element 501, a playback indication element 502, a contextual display element 504, and a control element 506.

The video stream playback mode can correspond to a mode in which the device may playback a video message and/or a video stream, and the user may control the playback. In operation, the video display element 501 can be configured to render the video for playback. The playback indication element 502 can display information related to an attribute of the playback, such as the play speed, within a text display. The playback indication element 502 may update its displayed information based on user input received at the control element 506, such as user inputs to fast forward or rewind. The contextual display element 506 can be configured to display contextual information related to the video. For example, the contextual display element 506 of the illustrated embodiment displays location and time information related to the presented video. The control element 506 can be configured to display one or more control elements for controlling playback of video. For example, in the illustrated embodiment, the control element 506 responds to a panel including rewind, skip-back, skip-ahead, fast-forward, pause, send-to, reply, and send-all graphical buttons.

Example Data Structure

Figure 6:
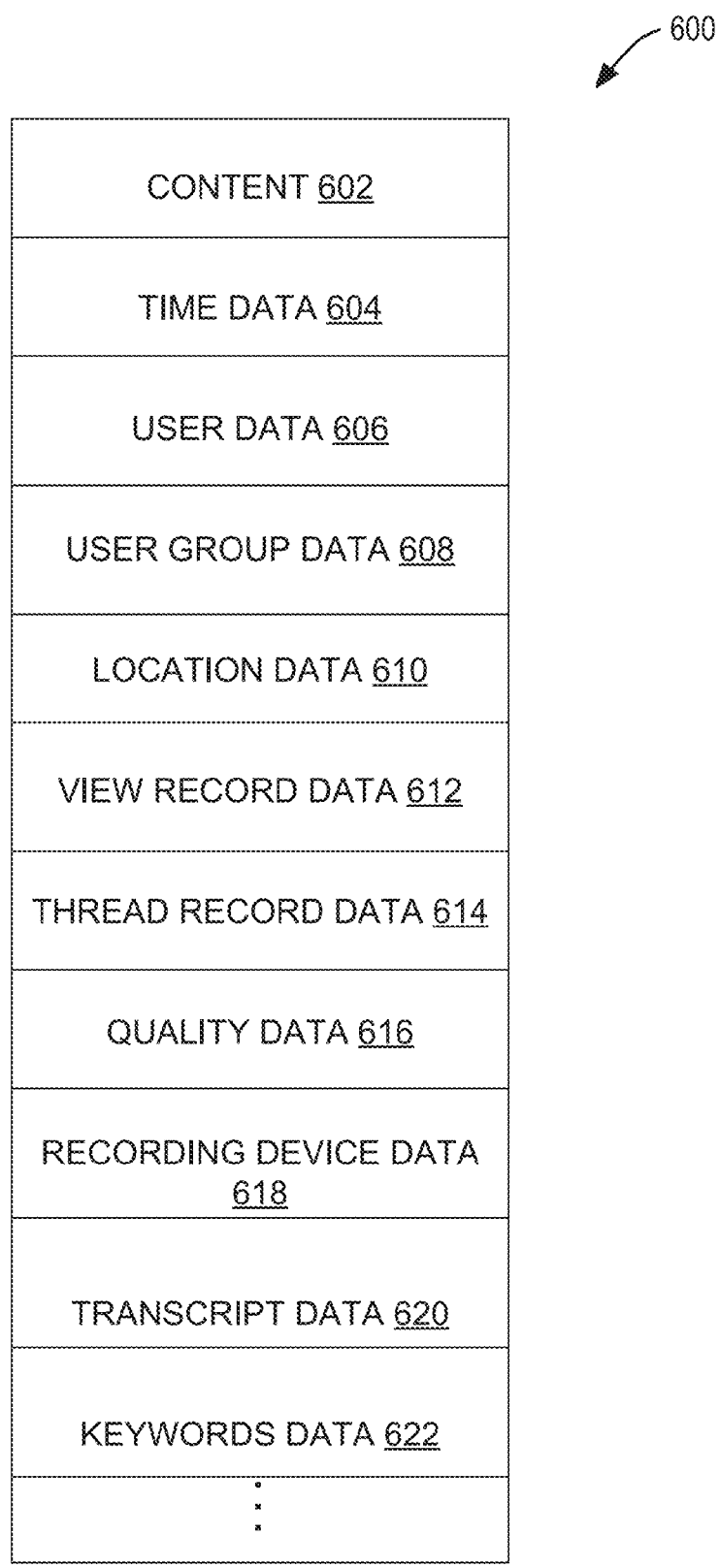
FIG. 6 is a block diagram illustrating an example video message data structure, according to some embodiments.

FIG. 6 is a block diagram illustrating an example video message data structure 600, according to some embodiments. The data structure 600 may be stored in the storage 27 of the device 27 and/or one or more servers 10. The data structure 600 may be created and/or accessed by the video storage interface module 320 in response to receiving a video message from the camera interface module 315, the video processing module 335, and/or the communication module 340.

The illustrated data structure 600 of FIG. 6 includes a content field 602, which may include the video content data as well as associated video identification data. Additionally, the illustrated data structure includes time data 604, user data 606, user group data 608, location data 610, view record data 612, thread record data 614, quality data 616, recording device data 618, transcript data 620, and keyword data 622. It will be appreciated the above-listed data fields are referenced by example only and that in other embodiments, the data structure 600 may include additional data fields and/or may not include every data field that is shown in FIG. 6.

The time data 604 can correspond to data indicative of a time, such as a time stamp. The time can be a time that the video message was captured, edited, and/or shared. The user data 606 can correspond to data indicative of the user who captured and/or shared the video message, as well as users who are in the video of the video message. The user group data 608 can correspond to data indicative of the target user group. User group user herein can mean one or more users connected by any suitable association, such as a social network group and its members (e.g., a membership-based group); a social graph (e.g., a collection of users defined by a relationship with respect to a particular user, such a first user and the first user's friends); users related by a suitable geographic characteristic (e.g., town, state, country, region, etc.); users related by interest, occupation, or the like characteristics; personal contacts of a user (e.g., a list of contacts a mobile phone or email application) ("personal contacts group"); users of a particular conversation (e.g., recipients of a group multimedia message) ("private communication group"); and a profile webpage and its hosts (e.g., users that may have read-write access) and its subscribers (each subscriber may have read-only access) ("following group"), as well as a public news/social/content/message feed ("message-feed group") displaying posts by user having write privileges. A user of a user group can have privilege, privacy, and/or permission attributes that can be used to determine whether the user can perform certain actions, such as posting to a user group, responding to a video message, sharing a video message, downloading or capturing a video message, sending a message to a particular user group, and the like. For example, a user may join a social network group to follow video messages of one or more celebrities. The user may have only observer status, meaning that the user may view the associated video stream but may not be able to post a video to be included in the video stream of the user group.

The users of the target user group may be notified that the video message has been shared or received. Accordingly, the video message may be viewable to users indicated by the user group data 608. Furthermore, the user group data 608 can include data indicative of privacy policies and permissions, such as users or user groups who may access the video message and/or who may share, forward, capture, and/or download the video message.

The location data 610 can correspond to data indicative of a location of at least one of the location that the video was recorded, the location of the user when the video was shared, the current location of the user, and/or the like location information. The view record data 612 can correspond to data indicative of which users who have viewed the video message, as well as the number of times that the video has been viewed. The thread record data 614 can correspond to data indicative of related video messages. For example, the thread record data 616 can be indicative of relationships of video messages in a threaded conversation (e.g., data indicative of parent-child relationship to other messages). The quality data 616 can correspond to data indicative of the quality of the video message, such as resolution, frame rate, bit rate, compression information, and the like. Additionally or alternatively, the quality data 616 can correspond to the settings of the device during the video, such as the shooting mode, lens focal length, lens aperture, shutter speed, ISO setting, aspect ratio, and the like. The recording device data 618 can correspond to data indicative of the device that was used to record the video message, such as device type, brand name, model identification, lens used, etc. The transcript data 620 can correspond to data indicative of a transcript of the audio of the video message. The keyword data 622 can correspond to data indicative of keywords associated with the video message. The keywords data 622 can be used for searching, categorizing, and sorting operations.

Communicating and Sharing Video Messages

Figure 7:
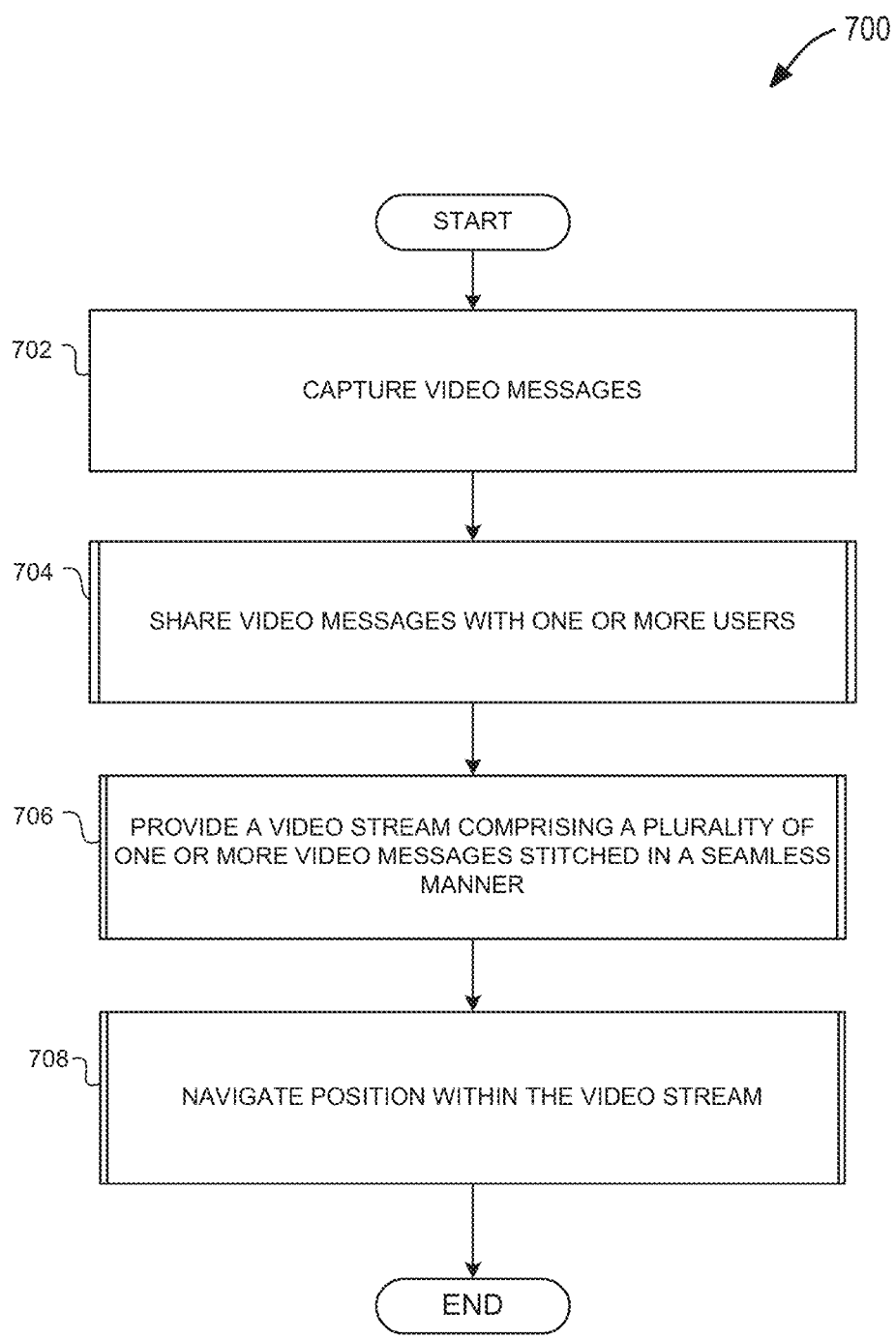
FIG. 7 is a flow diagram of an example method of communicating and sharing messages, according to some embodiments.

FIG. 7 is a flow diagram of an example method of communicating and sharing messages, according to some embodiments. In an embodiment, the operations of the method 700 are performed by the video message system 300. In operation 702, the device 20 may capture a video message with a camera 29. In one embodiment, the camera interface module 315 may be used to capture the video message. The captured video message may be a live video that dynamically and continuously captures a series of images within a field of view of the camera 29 in real-time. In addition, the captured video message may also include a retrieved video message that may be stored on the device 20. A preview of the captured video message may be shown on a display of the device 20 in real-time or upon retrieval. The video message may be captured by software included with the device 20 (e.g., operating system) or may be captured through an installed application or "app." Video message capture may be initiated automatically, for example, upon an incoming video message request, or it may be initiated manually by a user. A manual initiation may include a user input such as a touch input, a particular gesture and/or positional input, or a voice command. The video message capture may include intuitive inputs for initiating capture—such as simple gestures and/or voice commands. For example, the camera 29 may initiate video message capture upon a voice command to post or share a video message request from the user. For example, the voice command may include "start video message to Mike," to initiate a video message capture that will be sent to Mike. The capture may also be initiated based on a combination of inputs such as a combination of positional and touch input. For example, a "capture" position of the device may be detected along with a particular touch input. One example capture position is the camera 29 being held in a landscape orientation and facing a direction substantially parallel (e.g., within about 30 degrees from parallel) to the ground.

In addition, the user may use touch or use other gestures to start and stop video message capture. For example, the user may use touch inputs to pause the video message capture while repositioning the camera 29 to condense the length of the video message. In another example, a user may efficiently capture portions of video message with a single user touch to activate video message capture (e.g., only capture video during the touch). The fragmented video may be assembled and delivered to a viewer to view as a seamless continuous video message. In some embodiments, a seamless video that includes multiple videos can be controlled as if the video stream one video. For example, an example user interface may provide, on a user interface, a video navigation bar that displays a timeline of the video stream by aggregating the timelines of the multiple videos, providing the user a way to navigate through the multiple videos seamlessly. For example, the user may be able to move a user interface marker along a timeline to progress through the video stream to another point of the video stream, from a first video message to a second video message. Navigating through the video stream will be described in greater later in connection with FIG. 11.

The capture may also be initiated based on preset conditions such as a timer or upon recognizing certain conditions. For example, the capture may include facial recognition whereby the video message capture is initiated upon recognition of a particular person. Some of the techniques mentioned above and others may require the camera 29 to capture video as a background process of the device 20. For example, the camera 29 may continuously capture a video such that a user may initiate a command for sharing, for example, a video of the last 30 seconds. In another example, the camera 29 may begin video capture when it is detected that a user begins speaking and may end capture when it is detected that the user stops speaking. The video message capture may also pre-capture video such that a user may include a voice command such as "send the last 30 seconds of video to Mike." The video message capture may also parse out portions used for initiated the video or particular voice commands. In the example above, the "send the last 30 seconds of video to Mike" may be removed from the captured video.

To increase the functionality and seamlessness of video capture, minimized input requirements may be utilized. For example, a unique input command may be recognized as initiating video capture and/or sharing regardless of the current application running of the device. For example, a unique touch, gesture, or voice command may be recognized in order to initiate video capture. In addition, in order further increase seamlessness, the captured video may automatically be sent to a designated user without further input. For example, video may be sent automatically to the last user involved in a communication or the user may be designated based on predefined conditions or other criteria.

In operation 704, a user may share a video message to one or more users, and or groups. The user sharing the video message may select a particular user (e.g., friend) or group from the device 20. The user or group may be formed from a user's contact list, another application, a user's social network, and the like. For example, groups may include friends, family, coworkers, teammates etc. In addition to sharing the video message to specific users, the user may post video messages to a feed. Friends may then subscribe to the feed and receive new video messages as they are posted. The device 20 may include one or more menu selections for sharing the video message during video capture. For example, a button may be placed on the video preview screen to allow quick sharing to a user or group (see FIG. 6). Simple voice commands may also be used. For example, using the voice command "send video to hockey team," informs the device 20 to send the video message to members in the user's hockey team group. The device 20 may also employ automatic techniques for selecting which users or groups receive video messages. These techniques may include facial, and/or voice recognition. For example, the device 20 may determine that a particularly user appears or is referenced in a particular video message, and accordingly, shares the video message with the identified user. In another example, the user may select a user within a contact list as a user selection for sharing captured video message. For example, tapping and/or holding on a contact's name will automatically send the last captured video message to the selected user. Video messages may be shared in real-time or may be stored on a server and accessed in an on-demand fashion. An embodiment of operation 704 will be described in greater detail in connection with FIG. 8.

In operation 706, another user (e.g., friend) may retrieve a shared video message. The video message may be retrieved from a server or video messages may be received from another device directly. The video messages may be transmitted using a client-server architecture, peer-to-peer or distributed architecture. For example, a device 20 may store and upload video messages to other devices 10 as a background process in a distributed network arrangement. The video messages may be streamed from an external source or may be downloaded and stored locally on the device 20. Typically, the device 20 may include an installed app for accessing and viewing shared video messages, but the video messages may also be accessed on preinstalled software on the device 20 such as a media player or through a browser. In embodiments, accessing shared video messages may include techniques for improving the seamless experience of multiple video messages that may be "stitched" together. Video messages that are stitched together includes providing a continuous (e.g., seamless) viewing experience by combining multiple video messages one after the other.

Techniques for improving the viewing experience may include buffering techniques such as using predictive modeling. For example, a video message that a user may want to access may be predicted based on prior behavior of the user, peers, or other group members. Based on this prediction, a particular video message, stream, or portion of the video message may be predicted as being viewed and pre-buffered. Another technique may include downloading portions of a video message or video message stream as a background process on the device 20 to improve playback performance at the time of viewing. Another technique may also include showing particular still images within a video message sequence to improve the perceived seamlessness of a video message that may be stitched together. In another example, the initial portion of individual video messages may be pre-buffered based on a user's swipe history. For example, a user may typically only view the first few seconds of each individual video message. Accordingly, as an example, the first two-three seconds of each video message may be pre-buffered to enhance seamlessness to the viewer. The above techniques are merely examples and other known techniques may be also used to improve video message download and/or streaming performance.

As described above, video messages may be stitched together. In one example, the streaming video message may comprise separate video message files that are accessed individually and displayed and/or buffered in a manner to produce a continuous seamless video stream. In another example, multiple video files may be combined into a single video file which produces a continuous video stream. In another example, multiple videos may be written to a file as they are received to produce a continuous video stream. The techniques for stitching videos together as described above may occur at an external source such as on one or more servers or may be done locally on the device 20. The stitching may also occur in real-time or in an on-demand fashion.

In an embodiment, a user may receive notifications of a shared video message and a device 20 may display the notification in various ways. The device 20 may display a notification on the device including an actual video stream. For example, a window shade, notification screen, or home screen may play the video message as a thumbnail or icon. This allows a user to easily preview one or more video messages or streams and allows the user to evaluate if further action is necessary such as expand a relevant video message to full-screen or other action.

In another example, the video message may be displayed as the notification itself. For example, the audio within the video message may provide the audio notification. Accordingly, the video message may begin playing automatically at the receiving device as the notification.

Additionally or alternatively, an incoming video message may be played automatically when the sensor interface module 330 detects that the user is ready and is in a position to view the message (e.g., the user is holding and looking at the device) rather than when the video is received. Accordingly, the video message may begin playing automatically based on a position of the device 20 (e.g., via the sensor interface module 330). For example, upon a notification, the device 20 may detect a "viewing" position (i.e., the device is held up into the line of sight of the user). Detection can be based on facial recognition techniques provided by the camera interface module 315 and/or the video processing module 335. This determination may also take into account timing. For example, automatic playback can be performed in response to detecting a viewing position within predetermined number of seconds (e.g., within about 30 seconds) of receiving the notification, and for at least predetermined amount of time (e.g., greater than about 3 seconds). An example embodiment of operation 706 will be described in greater detail in connection with FIG. 10.

In operation 708, a user may navigate through one or more video messages that may that may be stitched together. The video messages may be from multiple users and may be stitched together based on various criteria. In an embodiment, video messages may be stitched together based on a chronological order. For example, video messages from all of a user's "friends" (e.g., video feeds to which the user subscribes) may be stitched together based on the time of posting the video message. The time may also be determined based on other criteria such as actual time the video message was taken (e.g., in cases where the poster decides the share the video message at a later time), when the video message was actually posted, or when the video message is received. Other criteria may also be used to when stitching video messages together such as user groups, content (relevance, topic, category etc.), quality, and other factors. Video messages may be stitched together in a prearranged manner or in real-time. For example, a user may decide to view video messages from a particular group, and accordingly, video messages may be filtered based on the particular group and then arranged in chronological order such that a continuous and seamless video stream may be viewed. In an embodiment, the video stream may be stitched together to create a single video file, or the stream may access multiple video files while still providing a seamless experience.

The video stream may show a preview of each individual video message (e.g., a still image) that comprises the video stream. The user may navigate within the video stream and select a particular video message within the stream to commence seamless playback. For example, if a user selects a particular video clip and when the selected video message ends, the video stream will commence playback of the subsequent video within the stream seamlessly (e.g., without interruption). The user may navigate the video stream using various touch inputs or other inputs commands. The touch inputs may include a swipe across (e.g., horizontal to the video) to navigate between individual video previews that comprise the video stream. For example, prior to playback of the video stream, the user may swipe to the right to progress forward in time through previews of a video stream that are arranged in chronological order. Similarly, the user may swipe to the left, for example, to view progress backwards in time within the video stream. The video stream may progress one video at a time, multiple videos at a time (e.g., jump), or dynamically (e.g., scrolling). During playback of the video stream, a swipe right may forward the video stream and a swipe left may rewind the video stream. Subsequent swipes may, for example, increase the rate at which the video stream forwards or rewinds. In addition, the length of a swipe during playback may alter the rate of forwarding or rewinding the playback. For example, a swipe may alter the rate logarithmically based on the length of the swipe. Additional gestures may be used for additional commands. For example, a swipe up or a swipe down may be used to provide additional menu selections. These menu selections may include filtering options such as filtering a video stream based on groups or other criteria. In one embodiment, the video stream may comprise as a default that all video clips from all "friends" or feeds to which a user subscribes. The default stream may be organized chronologically and the user may then filter the stream based on criteria (e.g., the group of coworkers). Video streams may also be ordered based on priority. Priority may include "closeness" of friends (e.g., based on degree of separation in a graph network) or other predefined or set criteria.

In an embodiment, the video stream may also be stitched together based on a video conversation. For example, a user may send a video message to a friend, and the friend may respond with a video message, which may be similarly to a video "walkie talkie" conversation. Accordingly, a created video stream may switch between each user as they respond to generate a seamless video of the conversation.

The user may also delete or "scrub" portions of the video stream in addition to or in alternative to only deleting individual videos. In an embodiment, a user may select a portion of the stream to delete or scrub, which may overlap between various individual videos. For example, the user may delete from a first time point to a second time point regardless of whether those times correspond to a single video. Some embodiment of scrubbing will be described in greater detail in connection with FIG. 11

In an embodiment, the technique may also employ intelligent bandwidth utilization. For example, video may be transmitted or streamed based on the capacity of the network (e.g., cellular carrier). Based on the determined capacity, transmissions of videos may be delay or otherwise efficiently routed.

In an embodiment, the device 20 may interact with a secondary device such as a TV. For example, the device 20 may detect a particular gesture input (e.g., a flick in a direction towards the TV), which initiates playback of a video stream on the TV. Accordingly, video control and input commands may still be inputted on the device 20, but may control functions on the TV. In addition, a gesture may be used to activate a camera on a TV for capturing a video including an additional video (e.g., additional angle) concurrent with video capture on the device 20.

Video Message Sharing

Figure 8:
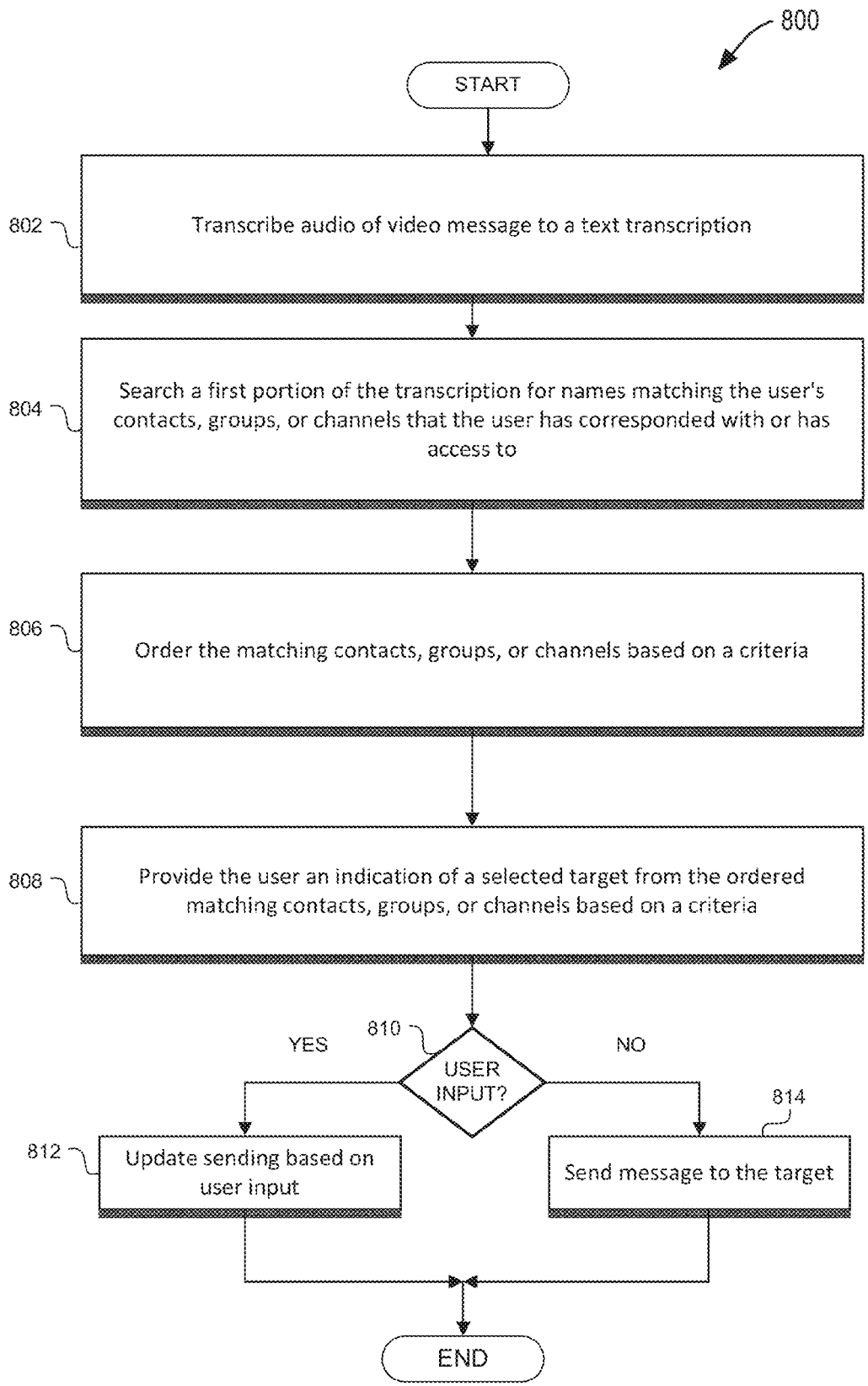
FIG. 8 is a flow diagram of an example method of sending a video message, according to some embodiments.

FIG. 8 is a flow diagram of an example method 800 of sending a video message, according to some embodiments. In one embodiment, the operations of method 800 can correspond to operations performed by the video message system 300. The example method 800 will be described, by way of explanation, below as being performed by certain modules. It will be appreciate, however, that the operations of the example method 800 can be performed in any suitable order by any number of the modules shown in FIG. 3. Furthermore, sending a video message may include additional operations not shown, and may omit one or more of the operations shown in FIG. 8.

At operation 802, the method 800 includes transcribing audio of video message to a text based representation ("a transcript"). Transcription can be performed automatically using any suitable speech-to-text module that can convert audio of a video file or an audio file to text. In one embodiment, operation 802 can be performed by video processing module 335 and the result can be stored using the video storage interface module 320.

In some embodiments, operation 802 can be performed before, after, or substantially concurrently with storing the video message on a server. For example, after the device 20 captures a video message, the device 20 can upload the message to a database 15 and, concurrently, transcribe a local copy of the message on the device 20.

At operation 804, the method 800 includes searching a first portion of the transcript for names matching the user's contacts, groups, or channels that the user has corresponded with or has access to. The first portion can correspond to the first two words to about the first ten words. In another embodiment, the method 800 can search the transcript until a matching name is identified. At operation 806, the method 800 includes ordering the contacts, groups, or channels that matched name in the transcript based on a matching criterion. For example, if more than one match is found, then the match corresponding to the most likely contact (e.g., the contact that was ordered/ranked first in operation 806) can be selected. The criterion can include any factor, including order of most recent correspondence and frequency of correspondence.

After the most likely match has been selected, in operation 808, the method 800 can include providing the user an indication of a selected target. In some embodiments, the video message can be sent to the selected target without prior confirmation from the user to send the message. For example, the indication is provided to the user at about the same time that the video message is sent to the target. In operation 810, the method 800 checks if the user has provided input in response to sending the indication to the user. User input can correspond to canceling the video message or selecting a new target for the video message. In operation 812, if input has been received, the method 812 includes updating the sending of the message based on the user input. In operation 814, if the user has not provided input, the method 800 can include sending the message to the target identified at operation 808.

It will be appreciated that the operations of method 800 are not limited to audio or video messages. Similar techniques can also be applied to sending a message to a recipient mentioned in a text message, email, or any other text based message, as well as 3D representation message. In one particular embodiment, the method 800 can operate on or with a computer wearable device, such an optical head-mounted display.

In an alternative embodiment, the video processing module 335 may search the transcript of the message for mentions of one or more users, and notify the identified users that that they have been mentioned in a message, or flag or show the message in a stream to those users who were mentioned in the message. For example, in a group communication involving multiple users receiving multiple messages from the group, the users may receive notifications of social messages in which the respective users were mentioned, or choose to view only messages in which they were mentioned.

Video Message Stitching

As described herein, sharing a video message may include sending or transmitting the video message to one or more users through various communications protocol, posting the video (e.g., live feed, or website), or other suitable means where another device may receive and/or access the shared video. As described herein and unless otherwise indicated, streaming may include accessing a video from a remote resource or may include accessing the video locally (e.g., from a storage on the device 20), or a combination of the two. It should be noted that although sharing of videos has been described herein, other forms of media or content such as audio and/or still images may also be shared in embodiments of the disclosed subject matter.

Some embodiment described herein can provide stitching together multiple video messages, on a mobile platform, instead of playing video messages separated by interruptions between messages. Stitching includes combining playback of video message conversations so the video messages appear one after another—either as a sequence of videos message or as one whole video message. These messages can be social conversations among multiple friends or a group or people, or a conversation of one person with another person.

Figure 9:
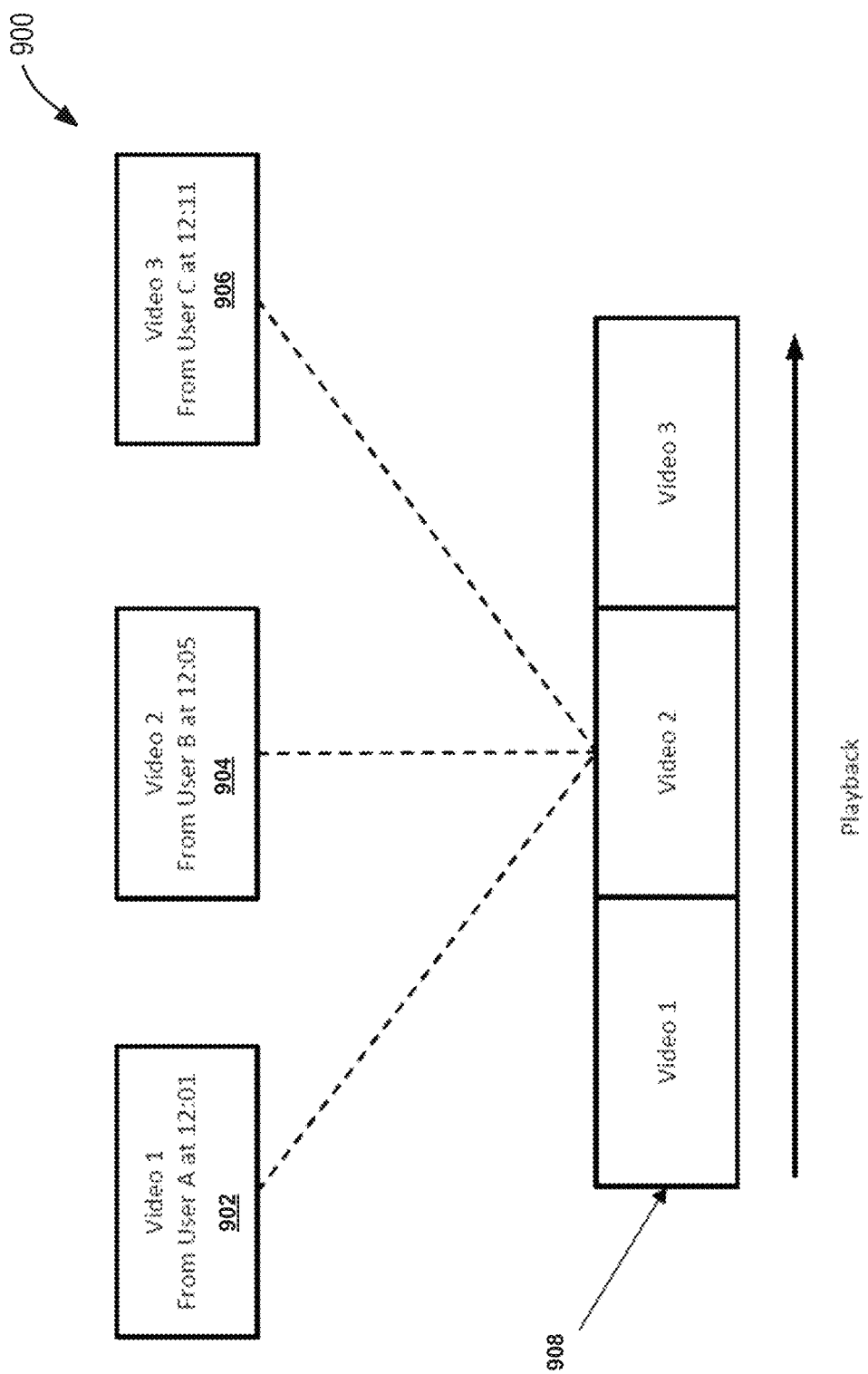
FIG. 9 is a schematic diagram of creating a seamless video stream, according to some embodiments, from multiple videos messages stitched together based on a chronological order.

FIG. 9 is a schematic diagram 900 of creating a seamless video stream 908, according to some embodiments, from multiple videos messages stitched together based on a chronological order. As shown a "Video 1" 902, "Video 2" 904, and "Video 3" 906 may be created at different times. Each of these videos may be combined (e.g., stitched together) in order to create a video stream 908. Accordingly, the seamless playback of the video occurs based on the chronological order of the videos included in the stream.

Figure 10:
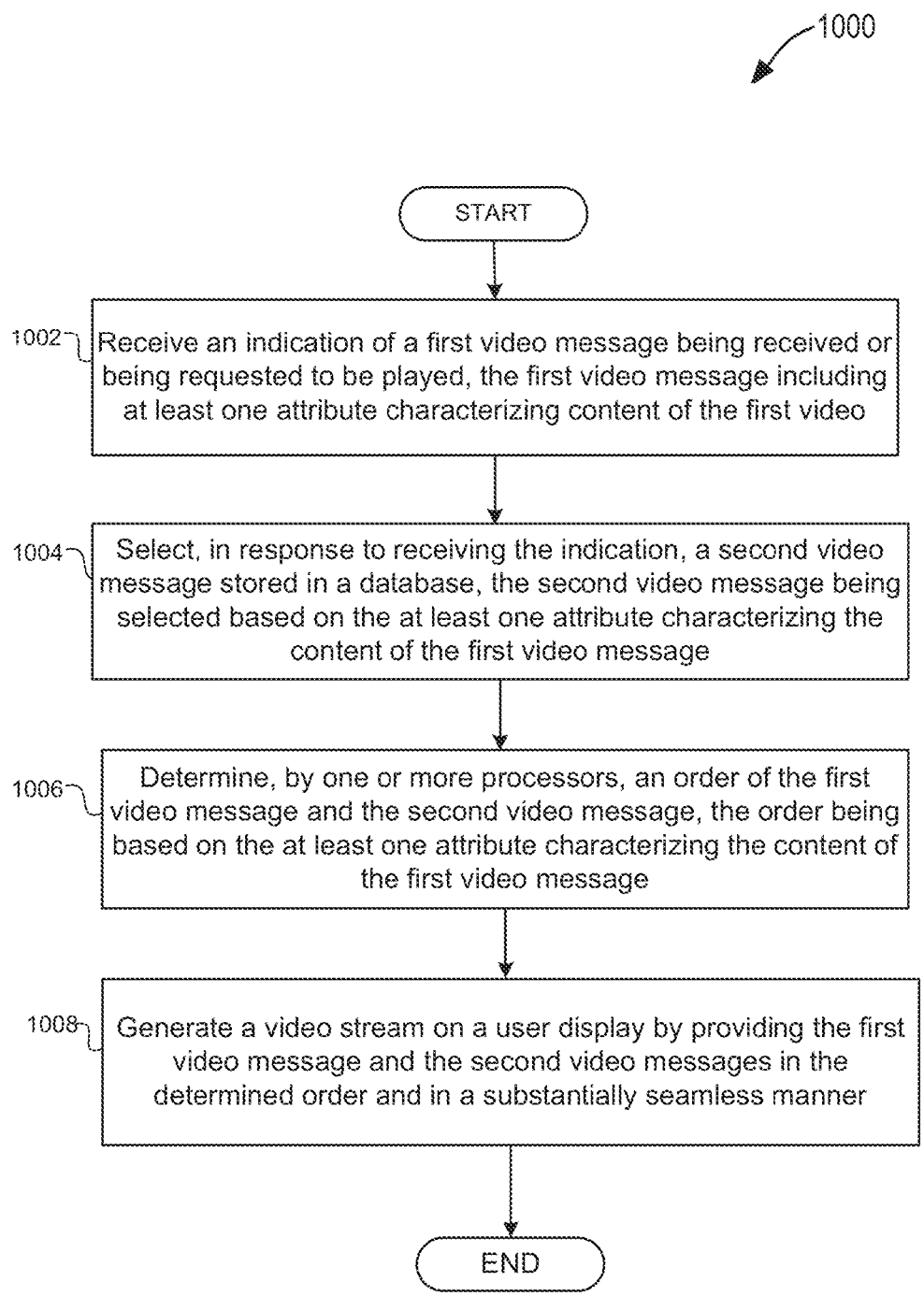
FIG. 10 is a flow diagram of an example method of stitching video messages, according to some embodiments.

FIG. 10 is a flow diagram of an example method 100 of stitching video messages, according to some embodiments. The example method 1000 will be described, by way of explanation, below as being performed by certain modules. It will be appreciate, however, that the operations of the example method 1000 can be performed in any suitable order by any number of the modules shown in FIG. 3. Furthermore, stitching video messages may include additional operations not shown, and may omit one or more of the operations shown in FIG. 10.

In operation 1002, the method includes receiving an indication of a first video message being received or being requested to be played. The first video message may include at least one attribute characterizing content of the first video. For example, the first video message may include a time stamp of the time that the video was recorded and an indication of the user group that the video message is targeted to for sharing.

In operation 1004, the method 1000 includes selecting, in response to receiving the indication, one or more stored video messages. The one or more video messages may be selected based on the at least one attribute characterizing the content of the first video message. For example, the one or more messages that are selected may match the first message with respect to a particular attribute, such as have been targeted to the same user group as the first video message. In one embodiment, operation 1004 can be performed by the video stich module 325, which may access the storage 27 or one or more databases 15 to select the stored video messages.

In some embodiments, the one or more stored video messages can be selected based on a message preference in order to filter the videos that will be provided to the user. Accordingly, videos matching the message preference may be selected or may be omitted. Examples of message preferences include keywords (e.g., to display videos having matching keywords), a selected user (e.g., to display videos from the selected user), or a search parameter (e.g., to display videos matching a provided search query).

In operation 1006, the method 1000 includes determining, by one or more processors, an order of the first video message and the one selected video messages. In one embodiment, the operation 1006 can be performed by the video stitch module 325. The order can based on the at least one attribute characterizing the content of the first video message. For example, the video messages can be ordered chronologically by time, as well as by popularity, relevance, and the like. The attribute used to order the video messages in operation 1006 can be the same or different from the attribute used to select the video messages.

In operation 1008, the method 1000 includes generating a video stream on a user display by providing the first video message and the one or more selected video messages in the order determined in operation 1006 and in a substantially seamless manner. It will be understood that generating a video stream can mean providing display data for a device to display the video stream, and it can also mean rendering the video at the client device (e.g., device 20). It will be understood that generating a video stream can mean generating a video stream file, and it can also mean providing and/or streaming the individual video messages dynamically so that a seamless video can be displayed. The video can have a starting point corresponding to the earliest video message of the video stream that has not been viewed by the user.

Scrubbing Video Streams

Some embodiments of scrubbing in systems allow only jumping between points on a video. Alternative embodiments described herein allow scrubbing within any point of the video and logarithmic scrubbing among videos.

In an embodiment a user can scrub among a collection of video messages from a social group or through personal communication, e.g., a sequential set of related videos. While some systems only provide a user the ability to scrub one video at a time, some embodiments described herein provide the user the ability to scrub among one video and/or multiple videos in sequential conversation or interaction of video messages among a group, or two or more individuals, or for a set of videos of a single individual (as in the case of memo videos for instance). Another embodiment provides control a scrubbing method by moving a finger on the actual video rather than on any scrubbing interfacing.

The start and stop points don't have to be part of the interface. The user can continue to scrub by raising his finger off the interface and putting it in another position therefore starting the scrub again, so it's related to it. Another thing is to normalize the length of all videos to a standard value.

Figure 11:
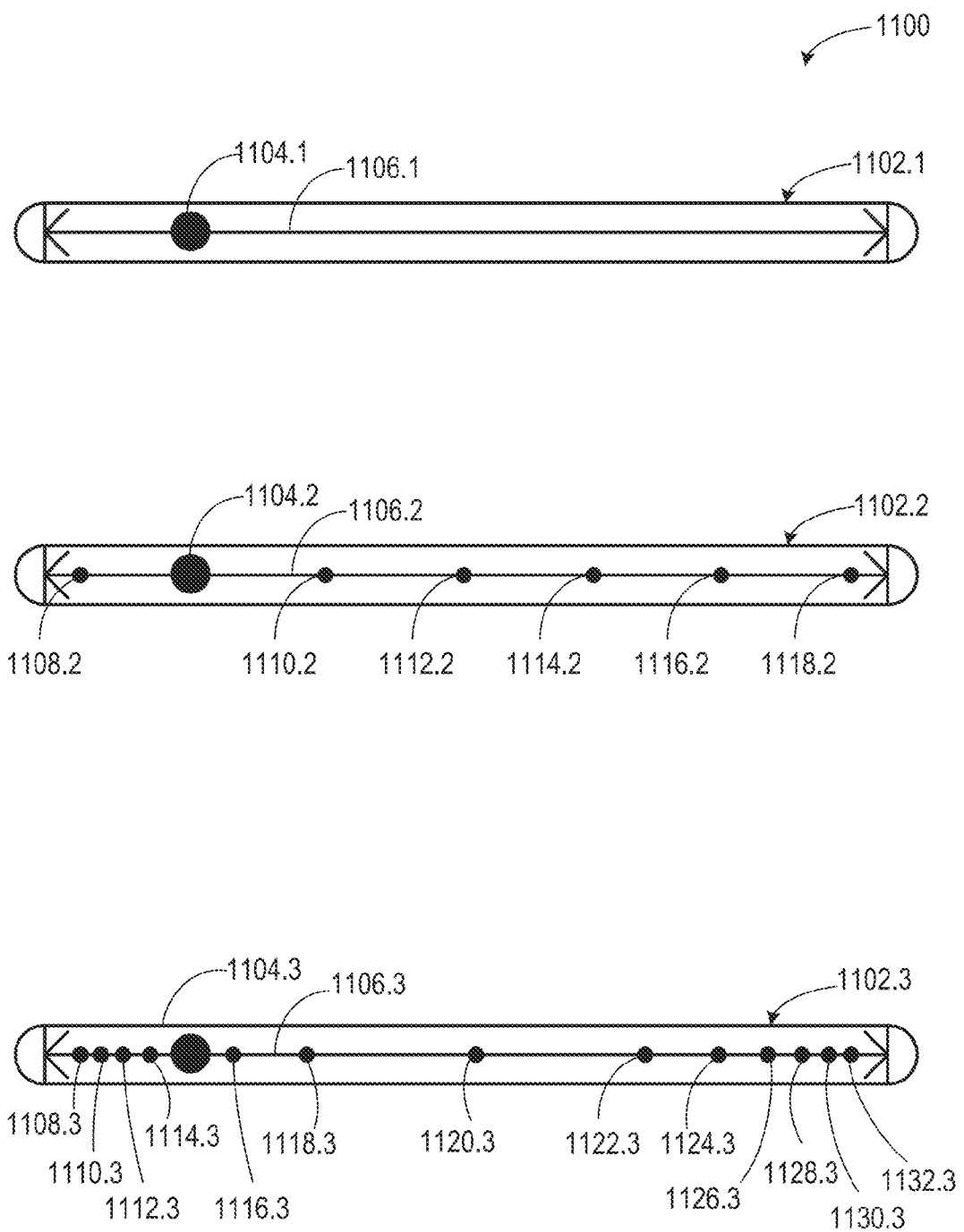
FIG. 11 includes schematic diagrams illustrating example navigation elements, according to some embodiments, of a user interface.

FIG. 11 includes schematic diagrams 1100 illustrating example navigation elements, according to some embodiments, of a user interface. While the embodiments are described herein in the context of video messages, it will be understood that the methods and systems can be applied to a number of content types, such as audio content (e.g., a stream of stitching songs) it is appreciated. Accordingly, the scrubbing elements and methods described herein can be used to navigate a playlist of audio songs. Additionally, scrubbing as used herein refers to seeking through a video stream itself or representations of the video stream, such as seeking through thumbnails of the video stream.

The scrubbing element 1102.1 includes a position marker 1104.1 on a timeline 1106.1. The position marker 1104.1 provides an indication of the current position of the stream playback. A user may control the position by moving the position marker 1104.1 along the timeline 1106.1.

In an alternative embodiment, the scrubbing element 1102.2 can include a position marker 1104.2 on a timeline 1106.2. The scrubbing element 1102.2 can also include markings (or "points") 1108.2-1118.2 on the timeline 1106.2. The markings 1108.2-1118.2 can provide indications of the positions of the previous and subsequent video messages in the video stream. The markings 1108.2-1118.2 can be uniformly spaced apart (each marking separated by the same distance from an adjacent marking) or spaced at a distance based on the length of the video message.

In an alternative embodiment, the scrubbing element 1102.3 can include a position marker 1104.3 on a timeline 1106.3. The scrubbing element 1102.3 can also include markings (or "points") 1108.3-1118.2 on the timeline 1106.2. The markings 1108.2-1132.3 can be spaced apart based on a logarithmic scale. For example, the timeline 1106.3 can correspond to a logarithmic scale. As another example, the markings 1108.3-1118.2 can be separated by a distance according to a logarithmic pattern (e.g., points near the center of the timeline 1106.3 are space farther apart than markings at the ends of the timeline 1106.3).

A further embodiment may control scrubbing as will be described: The user can place his finger anywhere on the screen, and as he moves the finger within a distance back and forth, scrubbing is performed linearly within a certain video (e.g., between points 118.3 and points 1122.3), but as the user scrubs his finger beyond a certain distance, scrubbing continues to prior videos or subsequent videos, in a speed that can be linear or logarithmic. The algorithm can also normalize the time of each video so for instance, either a 10 sec or a 60 sec video would have the same length in the scrubbing timeline.

Another feature of an embodiment is to color-code different videos to allow the user to identify which videos are his, or his friends, or new, when he scrolls through the videos. For example, portions or the background of the timeline 1106 may be color coded.

Another feature of an embodiment is to use names, locations, and/or face icons and overlay them on top of the videos in the stream of sequential videos or in the video messages coming in based on the person who created them. For example, icons may be superimposed on top of the timeline 1106.

Another feature of an embodiment is that an incoming video message may start playing instantly in real time when the user is doing anything else in the application—or elsewhere in the device. Another feature of an embodiment is to be able to go back from this newly playing video to where you were in the application or video stream or sequence, by pressing a button that appears to go back.

Another feature of an embodiment is being able to search the sequence of videos based on a transcript of the video, and then the application will show you visually the videos that pop up and then you can watch only those videos and the points in the videos that they came up, and they can also be color coded while you are scrubbing, and in thumbnails above the videos.

Example System Interaction

Figure 12:
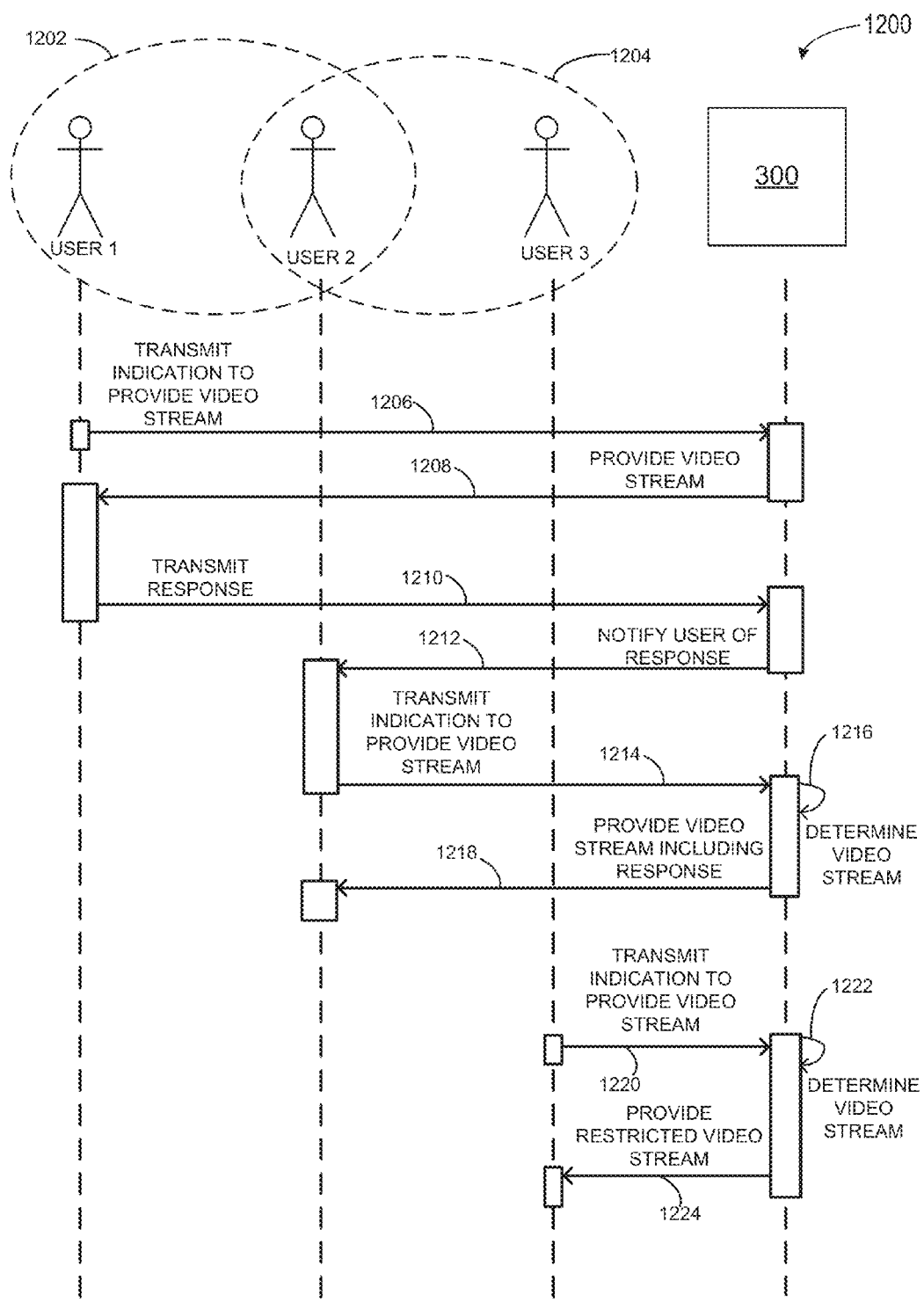
FIG. 12 is an interaction diagram illustrating an example use case, according to an embodiment, of multiple users providing and receiving video messages a communication system.

FIG. 12 is an interaction diagram illustrating an example use case 1200, according to an embodiment, of multiple users providing and receiving video messages a communication system. In particular, FIG. 12 illustrates interactions of multiple users (e.g., User 1, User 2, and User 3) communicating video messages with the video message system 300 of FIG. 3. In the illustrated embodiment, User 1 and User 2 can be included in a user group 1202 and User 2 and User 3 can be included in a user group 1204. As will be described below, the user groups 1202, 1204 may correspond to social graphs of a social network. For example, the user group 1202 may correspond to User 1 and User's connections (e.g., "friends"). In a similar way, the user group 1204 may correspond to User 2 and User 2's connections. However, as stated, in alternative embodiments, the user groups 1202, 1204 can each correspond to other types of user groups, including, but is not limited to, other suitable social network groups, graphs, or message feeds, among other types of user groups. Furthermore, additional users and/or groups (not shown) may be included.

In the illustrated use case 1200, each of User 1, User 2, and User 3 can correspond to one of a various devices, such as the device 20 of FIG. 1, and the video message system 300 can be part of a communication system. While the description of the illustrated interactions will be described below in the context of a client-server relationship between User 1, User 2, User 3, and the video message system 300, it will nonetheless be appreciated that other types of relationships can chosen. For example, the various operations described below can be performed by any suitable user or the components of the video communication system 300.

At operation 1206, User 1 may transmit to the video message system 300 an indication to provide a video stream. For example, User 1 may use the device 20 of FIG. 1, which may be executing a software application for supporting video messaging services, to transmit the indication. The indication may correspond to a direct request from user, an automated response to request a video stream (such as the device 20 detecting User 1's attention), and/or a search request, among others. Furthermore, the indication may be a request to view video messages associated with a particular user group, such as the user group 1202 (e.g., User 1 and User 2), or any other suitable user group. In some embodiments, User 1 need not belong to the user group in order to request a video message from the user group.

The indication can be provided for pushing or pulling the video message to User 1. For example, in a pull embodiment, the indication may be provided by User 1 as a request to the video message system 300 to provide the video stream. In alternative embodiment, the indication can be provided in response to the video message system providing a first indication for providing the video stream as an acknowledgment that User 1 is ready for receiving the video stream.

At operation 1208, in response to receiving the indication from User 1, the video message system 300 may provide User 1 a video stream, for example in accordance with the method 1000 of FIG. 10. In particular, the video message system 300 may select a plurality of videos viewable by User 1. A video may be viewable to User 1 based on the user groups that User belongs to. For example, certain videos are viewable be only certain user groups or users. Accordingly, in the illustrated embodiment, the video message system 300 may select videos messages that were targeted or otherwise associated with user group 1202. Additionally or alternatively, one or more of these videos may be omitted based on permission attributes of the omitted video messages and/or User 1.

Of the selected videos, the video message system 300 may determine an order, in accordance with block 1006 of FIG. 10. For example, the selected video messages may be ordered chronologically from the oldest message to the newest message. The video stream may be provided in either a streaming or downloading manner. Furthermore, the video stream may be generated as a separate file, and the separate file can be provided to User 1. As stated, in an alternative embodiment, the video stream may be provided by providing the video messages one at a time in the determined order. The video messages may be provided in a continuous manner (e.g., without substantial interruption).

At operation 1210, User 1 may transmit to the video message system 300 a video message. For example, the video message transmitted at 1210 may be a video response to one of the videos of the video stream. In particular, the video response may be a reply to a video provided by User 2. The video response may include one or more privacy, permission, privilege attributes that may be used to determine which users may view the response, may respond to the response, may share the response, may comment on the response, and/or the like.

At operation 1212, in response to receiving the video message, the video message system 300 may notify one or more users of the received video. For example, the video message system 300 may notify each user to whom the video response is directed to either directly or indirectly (e.g., in a threaded conversation of multiple users). In alternative embodiments, other suitable notifications may be sent, for example, to users of groups that include User 1 and/or User 2.

At operation 1214, in response to receiving the notification of the new video message, User 2 may transmit to the video message system 300 an indication to provide the video message and/or a video stream. At operation 1216, the video message system 300 may update or determine a video stream that can be viewable by User 2. For example, the video message system 300 may determine a video stream by adding the response video to the previous video stream such that the video stream provides the videos chronologically. In other embodiment, the video stream to be provided to User 1 can include videos messages from one or more of the user groups associated with User 2, e.g., user groups 1202, 1204. In this way, the video stream of User 1 may be substantially different from the video stream provided to User 2. At operation 1218, the video message system 300 may provide the updated video stream to User 2.

At operation 1220, User 3 may transmit to the video message system 300 an indication to provide the video message and/or a video stream. At operation 1222, the video message system 300 may update or determine a video stream that is viewable by User 3. In the illustrated embodiment, the video stream determined for User 3 may or may not include the video response of User 1 that was provided at operation 1210. Whether or not the video response is included may be based on the privilege, permission, and/or security attributes of User 1, User 3, the video response, and/or the user groups 1202, 1204.

In one example embodiment, User 3 may be a subscriber to the message feed of user group 1202. In this case, User may view video stream including the videos posted by the users of user group 1202. In some embodiments, User 3 may have read-only access and/or read-write access to the video stream of user group 1202. At operation 1224, the video message system 300 may provide a video stream viewable by User 3.

The flow diagrams described herein are just examples. There may be variations to these diagrams or the steps (or operations) described therein without departing from the embodiments described. For instance, the steps may be performed in a differing order, or steps may be added, deleted or modified.

References to "one embodiment," "an embodiment," "an example embodiment," and the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be included in other embodiments whether or not explicitly described. The term "substantially" may be used herein in association with a claim recitation and may be interpreted as "as nearly as practicable," "within technical limitations," and the like.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

What is claimed is:

1. A computer-implemented method for creating video messages, comprising:
   receiving, from a first user at a first device, a first video message and targeting information for the first video message;
   providing the first video message to a second user at a second device and a third user at a third device based on the targeting information;
   receiving from the second user a second video message in response to the first video message;
   receiving from a third user a third video message in response to the first video message; and
   providing customized video streams to each of the first user, the second user, and the third user, wherein providing each customized video stream comprises stitching together a subset of the first video message, the second video message, and the third video message based on the targeting information associated with each specific user;
   wherein the customized video streams are presented in a continuous manner with each included video message in chronological order;
   wherein a first video stream that is provided to the first user and the second user is distinct from a second video stream that is provided to the third user;
   wherein a first customized video stream sent to the first user and the second user includes the first video message, the second video message, and the third video message; and
   wherein a second customized video stream sent to the third user includes the second video message and the third video message but does not include the first video message due to privilege, permission, groups, and security attributes associated with the first user and the third user.

2. The computer-implemented method of claim 1, wherein the targeting information for a video message comprises:
   a source user for the video message;
   one or more user groups that associate two or more users;
   a set of permissions that is associated with the source user, a target user, and one or more user groups;
   a set of sharing attributes that are associated with the source user and the video message;
   the subject matter of the video message; and
   a relevancy metric for the video message that is calculated on a per-user basis.

3. The computer-implemented method of claim 2, wherein providing a customized video stream further comprises:
   generating a transcript of the video message using a speech-to-text technique;
   analyzing the transcript to determine the name of a target user and one or more keywords that identifies the subject matter of the video message; and
   using the determined information to send the customized video stream to the target user and perform one or more tasks that are associated with the video message.

4. The computer-implemented method of claim 3, wherein receiving the first video message further comprises:
   using a video processing module to monitor a camera on the first device;
   analyzing a video data stream received from the camera to determine in the video data stream a user request to record and send the first video message.

5. The computer-implemented method of claim 4, wherein analyzing the video data stream further comprises:
   continuously capturing video from the camera;
   determining a user voice command within the captured video, wherein the voice command requests that a specified time interval of the preceding captured video should be sent as a video message; and
   sending the specified portion of the preceding captured video as the first video message.

6. The computer-implemented method of claim 5,
wherein the user voice command within the captured video further specifies a target user for the video message, and
wherein sending the specified portion of the preceding captured video message comprises sending the first video message to the target user.

7. The computer-implemented method of claim 2, wherein the method further comprises:
determining that a fourth user is associated with a user group that includes at least one of the first user, the second user, and the third user;
determining that the fourth user is associated with a request to view video messages associated with the user group; and
providing the second video stream to the fourth user;
wherein the fourth user has observer status and may view the second video stream but is not permitted to post video messages that are included in the video streams.

8. The computer-implemented method of claim 1, the method comprising:
receiving an indication that is at least one of a first video being received or the first video being requested to be played, the first video including at least one attribute characterizing content of the first video;
selecting, in response to receiving of the indication, a second video stored in a database, the second video being selected based on a first attribute characterizing the content of the first video;
determining, by one or more processors, an order of the first video and the second video, the order being based on a second attribute characterizing the content of the first video; and
generating a video stream to be presented on a user display, the video stream including the first video and the second video in the determined order and the presenting being in a seamless manner.

9. The computer-implemented method of claim 8, further comprising:
determining of the order of the first video and the second video comprises comparing the time of the first video and a time of the second video, the order being chronological based on the comparison.

10. The computer-implemented method of claim 8, wherein generating the video stream comprises providing a color code for the first and second videos based on respective users associated with providing the respective first and second videos.

11. The computer-implemented method of claim 8, further comprising:
receiving a user input resulting from a swiping gesture; and
controlling, based on the user input, playback of the video stream by progressing through the video stream if the swiping gesture is in a first direction, and by selecting another video stream different from the generated video stream if swiping gesture is in a second direction.

12. The computer-implemented method of claim 8, further comprising:
receiving a user input resulting from a swiping gesture during playback of the video stream; and
adjusting, based on the user input, a speed of the playback of the video stream.

13. The computer-implemented method of claim 8, further comprising:
receiving a user input; and
deleting, based on the user input, a portion of at least one video of the video stream.

14. The computer-implemented method of claim 8, further comprising:
receiving, from a first device of a first user, a user input resulting from a gesture;
identifying, in response to the user input, a proximal second device; and
providing, based on the user input, the video stream to the second device.

15. The computer-implemented method of claim 8, further comprising displaying metadata in the video stream, the metadata being included in at least one of the first video or the second video.

16. The computer-implemented method of claim 1, further comprising:
receiving the first video stream on the second device;
determining that the second device is oriented in a specific viewing position within a specified time interval of the receipt of the first video stream;
determining that the second device has remained in the specific viewing position for a second specified time interval; and
if so, automatically playing the first video stream on the second device.

17. A computer-implemented method for processing video streams, comprising:
receiving, from a first user at a first device, a first video;
receiving, from a second user at a second device, a second video;
receiving, from a third user, a third video message;
analyzing the first video and the second video to determine at least one attribute characterizing content of the first video from a portion of the first video;
executing a command based on the attribute; and
providing customized video streams to each of the first user, the second user, and the third user, wherein providing each customized video stream comprises stitching together a subset of the first video message, the second video message, and the third video message based on targeting information associated with each specific user and the attribute;
wherein the customized video streams are presented in a continuous manner with each included video message in chronological order;
wherein a first video stream that is provided to the first user and the second user is distinct from a second video stream that is provided to the third user;
wherein a first customized video stream sent to the first user and the second user includes the first video message, the second video message, and the third video message; and
wherein a second customized video stream sent to the third user includes the second video message and the third video message but does not include the first video message due to privilege, permission, groups, and security attributes associated with the first user and the third user.

18. The computer-implemented method of claim 17, wherein the at least one attribute is targeting information of the second user or a user group to which the second user belongs.

19. The computer-implemented method of claim 17, further comprising generating a transcript of the first video message, wherein the video stream is searchable based on the transcript to determine the attribute.

20. The computer-implemented method of claim 17, wherein the attribute, a user name mentioned in the first video and the command is providing, to a user corresponding to the identified user name, a notification of the first video.

21. The computer-implemented method of claim 17, further comprising:
providing a scroll bar to be displayed on a user interface for the video stream;
   receiving user input from the scroll bar; and
   moving, based on the received user input, a current position of the video stream in a logarithmic fashion.

22. A non-transitory computer-readable storage medium storing instructions which, when executed by one or more processors, cause the one or more processors to perform operations, comprising:
   receiving, from a first user at a first device, a first video message and targeting information for the first video message;
   providing the first video message to a second user at a second device and a third user at a third device based on the targeting information;
   receiving from the second user a second video message in response to the first video message;
   receiving from the third user a third video message in response to the first video message; and
   providing customized video streams to each of the first user, the second user, and the third user, wherein providing each customized video stream comprises stitching together a subset of the first video message, the second video message, and the third video message based on the targeting information associated with each specific user;
   wherein the customized video streams are presented in a continuous manner with each included video message in chronological order;
   wherein a first video stream that is provided to the first user and the second user is distinct from a second video stream that is provided to the third user;
   wherein a first customized video stream sent to the first user and the second user includes the first video message, the second video message, and the third video message; and
   wherein a second customized video stream sent to the third user includes the second video message and the third video message but does not include the first video message due to privilege, permission, groups, and security attributes associated with the first user and the third user.

23. A non-transitory computer-readable storage medium storing instructions which, when executed by one or more processors, cause the one or more processors to perform operations, comprising:
   receiving, from a first user at a first device, a first video message;
   receiving, from a second user at a second device, a second video;
   receiving, from a third user, a third video message;
   analyzing the first video and the second video to determine at least one attribute characterizing content of the first video from a portion of the first video;
   executing a command based on the attribute; and
   providing customized video streams to each of the first user, the second user, and the third user, wherein providing each customized video stream comprises stitching together a subset of the first video message, the second video message, and the third video message based on targeting information associated with each specific user and the attribute;
   wherein the customized video streams are presented in a continuous manner with each included video message in chronological order;
   wherein a first video stream that is provided to the first user and the second user is distinct from a second video stream that is provided to the third user;
   wherein a first customized video stream sent to the first user and the second user includes the first video message, the second video message, and the third video message; and
   wherein a second customized video stream sent to the third user includes the second video message and the third video message but does not include the first video message due to privilege, permission, groups, and security attributes associated with the first user and the third user.

* * * * *